United States Patent
Lyle et al.

(10) Patent No.: US 8,751,581 B2
(45) Date of Patent: Jun. 10, 2014

(54) SELECTIVELY BLOCKING INSTANT MESSAGES ACCORDING TO A DO NOT INSTANT MESSAGE LIST

(75) Inventors: Ruthie D. Lyle, Durham, NC (US); Michael Muller, Medford, MA (US); Vaughn T. Rokosz, Newton, MA (US); Andrew L. Schirmer, Andover, MA (US)

(73) Assignee: International Business Machines Corporation, Armonk, NY (US)

( * ) Notice: Subject to any disclaimer, the term of this patent is extended or adjusted under 35 U.S.C. 154(b) by 3153 days.

(21) Appl. No.: 11/040,069

(22) Filed: Jan. 21, 2005

(65) Prior Publication Data
US 2006/0168048 A1    Jul. 27, 2006

(51) Int. Cl.
*G06F 15/16* (2006.01)

(52) U.S. Cl.
USPC .......................................... 709/206; 709/207

(58) Field of Classification Search
USPC ................................................ 709/202–206
See application file for complete search history.

(56) References Cited

U.S. PATENT DOCUMENTS

| | | | |
|---|---|---|---|
| 4,815,851 A | 3/1989 | Soohoo | |
| 4,921,354 A | 5/1990 | SooHoo | |
| 5,196,905 A | 3/1993 | Hahn et al. | |
| 5,381,436 A | 1/1995 | Nelson et al. | |
| 5,442,441 A | 8/1995 | Grover et al. | |
| 6,112,227 A * | 8/2000 | Heiner | 709/203 |
| 6,701,160 B1 * | 3/2004 | Pinder et al. | 455/550.1 |
| 6,965,919 B1 * | 11/2005 | Woods et al. | 709/206 |
| 2003/0233418 A1 | 12/2003 | Goldman | |
| 2004/0143633 A1 | 7/2004 | McCarty | |
| 2004/0158631 A1 | 8/2004 | Chang et al. | |
| 2004/0177048 A1 | 9/2004 | Klug | |
| 2004/0194116 A1 | 9/2004 | McKee et al. | |
| 2005/0044160 A1 * | 2/2005 | McElligott | 709/207 |
| 2005/0055416 A1 * | 3/2005 | Heikes et al. | 709/207 |
| 2005/0246344 A1 * | 11/2005 | Keller et al. | 707/10 |
| 2006/0031307 A1 * | 2/2006 | Bhatia | 709/206 |
| 2006/0168009 A1 | 7/2006 | Lyle et al. | |

* cited by examiner

*Primary Examiner* — Shirley Zhang
(74) *Attorney, Agent, or Firm* — Steven M. Greenberg, Esq.; CRGO Law

(57) ABSTRACT

A method, system and apparatus for selectively blocking the transmission of an unsolicited instant message. The method of the invention can include receiving an instant message designated an intended recipient; locating the intended recipient in a do not instant message list; and, responsive to the location, blocking the instant message for subsequent transmission to the intended recipient. Notably, the blocking step can include the step of selectively blocking the instant message based upon a specified policy defined for the intended recipient.

6 Claims, 2 Drawing Sheets

_US 8,751,581 B2_

SELECTIVELY BLOCKING INSTANT MESSAGES ACCORDING TO A DO NOT INSTANT MESSAGE LIST

BACKGROUND OF THE INVENTION

1. Statement of the Technical Field

The present invention relates to unsolicited commercial electronic messages and more particularly to controlling the receipt of unsolicited instant messages.

2. Description of the Related Art

Historically, the print medium served as the principal mode of unsolicited mass advertising on the part of the direct marketing industry. Typically referred to as "junk mail", unsolicited print marketing materials could be delivered in bulk to a vast selection of recipients, regardless of whether the recipients requested the marketing materials. With an average response rate of one to two percent, junk mail has been an effective tool in the generation of new sales leads. Nevertheless, recipients of junk mail generally find the practice to be annoying. Additionally, postage for sending junk mail can be expensive for significant "mail drops". Consequently, the direct marketing industry constantly seeks equally effective, but less expensive modalities for delivering unsolicited marketing materials.

The advent of electronic mail has provided much needed relief for direct marketers as the delivery of electronic mail to a vast number of targeted recipients requires no postage. Moreover, the delivery of unsolicited electronic mail can be an instantaneous exercise and the unsolicited electronic mail can include embedded hyperlinks to product or service information thus facilitating an enhanced response rate for the "mail drop". Still, as is the case in the realm of print media, unsolicited electronic mail, referred to commonly as "spam", remains an annoyance to consumers worldwide. As a result, an entire cottage industry of "spam filters" has arisen whose task solely is the eradication of spam.

Like electronic mail, instant messaging has proven to be fertile ground for the mass marketer. Referred to in the art as "spim", unsolicited instant messages have proven to be even a greater annoyance than spam. When received in an e-mail server, spam is not noticed by the recipient until the inbox for the e-mail server has been scanned. At worst, a "new message" notification can be activated pending the review of the newly received spam message by the recipient. In the case of instant messaging, however, the impact is immediate.

Specifically, spim when received causes the activation of a viewer which can "pop up" and distract the recipient. Moreover, spim like spam can consume network resources which can drain user productivity. Even workplace issues can arise where spim includes sexually explicit materials which can be viewed by unsuspecting passersby in proximity to the instant messenger client. Importantly, unlike e-mail based spam, instant messaging based spim cannot be merely deleted. Rather, the spim can become part of the record of the instant messaging session.

Spim often can be generated by "bots"—automated logic charged with the task of identifying possible instant messenger recipients and forwarding instant messages to the recipients as if the instant messages originated from an actual instant message user. Often, the list of instant messenger recipients can be generated randomly, or harvested through Internet probing operations. Given the level of automation available to the spim artist, estimates now place spim at epidemic levels in excess of 500 million spims per day.

Several products have attempted to address the spim epidemic. For example, anti-spim filters have been developed to identify keywords in spim in order to quash the receipt of spim messages. Additionally, it is known to block the receipt of an incoming instant message from a particular instant messenger identifier or screen name. Some systems restrict the receipt of instant messages to those which originate from within a specified domain or network. Yet other systems identify instant messenger sources which have added the recipient to a buddy list. Consequently, a "reverse buddy list" can be generated based upon which subsequent messages can be blocked which originate from users in the reverse buddy list. In all cases, however, spim remains a troublesome element of computer communications.

SUMMARY OF THE INVENTION

The present invention addresses the deficiencies of the art in respect to spim management and provides a novel and non-obvious method, system and apparatus for selectively blocking the transmission of an unsolicited instant message. The method of the invention can include receiving an instant message designated an intended recipient; locating the intended recipient in a do not instant message list; and, responsive to the location, blocking the instant message for subsequent transmission to the intended recipient. Notably, the blocking step can include the step of selectively blocking the instant message based upon a specified policy defined for the intended recipient.

In a preferred aspect of the present invention, the blocking step can include determining whether the instant message is an unsolicited instant message and selectively blocking the instant message if the do not instant message list indicates that unsolicited instant messages are to be blocked. In this regard, the determining step can include determining whether a bot transmitted the instant message. The blocking step itself can include selectively blocking the instant message based upon a specified policy defined for the intended recipient and for content in the instant message.

In a specific aspect of the invention, the blocking step can include performing selective blocking such as absolutely blocking the instant message, queuing the instant message for later delivery or redirecting the instant message. Also, the blocking step can include transmitting an updated local copy of the do not instant message list to a source of the instant message. Moreover, the transmission can be logged for the source of the instant message.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for selectively blocking instant messages according to a do not instant message list. In accordance with the present invention, a do not instant message list can be established which can include a listing of instant messaging recipients seeking to avoid unsolicited instant messages. The list can include a set of absolute rules for blocking unsolicited messages addressed to listed instant messaging recipients, or the list can include policy rules which, when applied either to the sender of an instant message, or the content of an instant message, or both, can produce a selected determination of whether the instant message is to be blocked or routed to the designated recipient.

The do not instant message list can be managed by an instant messaging provider hosting the instant messaging server. In this regard, the use of the do not instant message list can be voluntary in nature and the host provider can promote the support of the list as a product benefit. Moreover, the host provider can negotiate with direct marketing entities to ensure compliance. Alternatively, the creation and management of the list can be legally mandated and can be maintained by a governmental agency or by a private agent of a governmental agency. The list yet further can be created and managed by a professional association in concert with the distribution of a service mark indicating the association and use of the do not instant message list.

Figure 1:
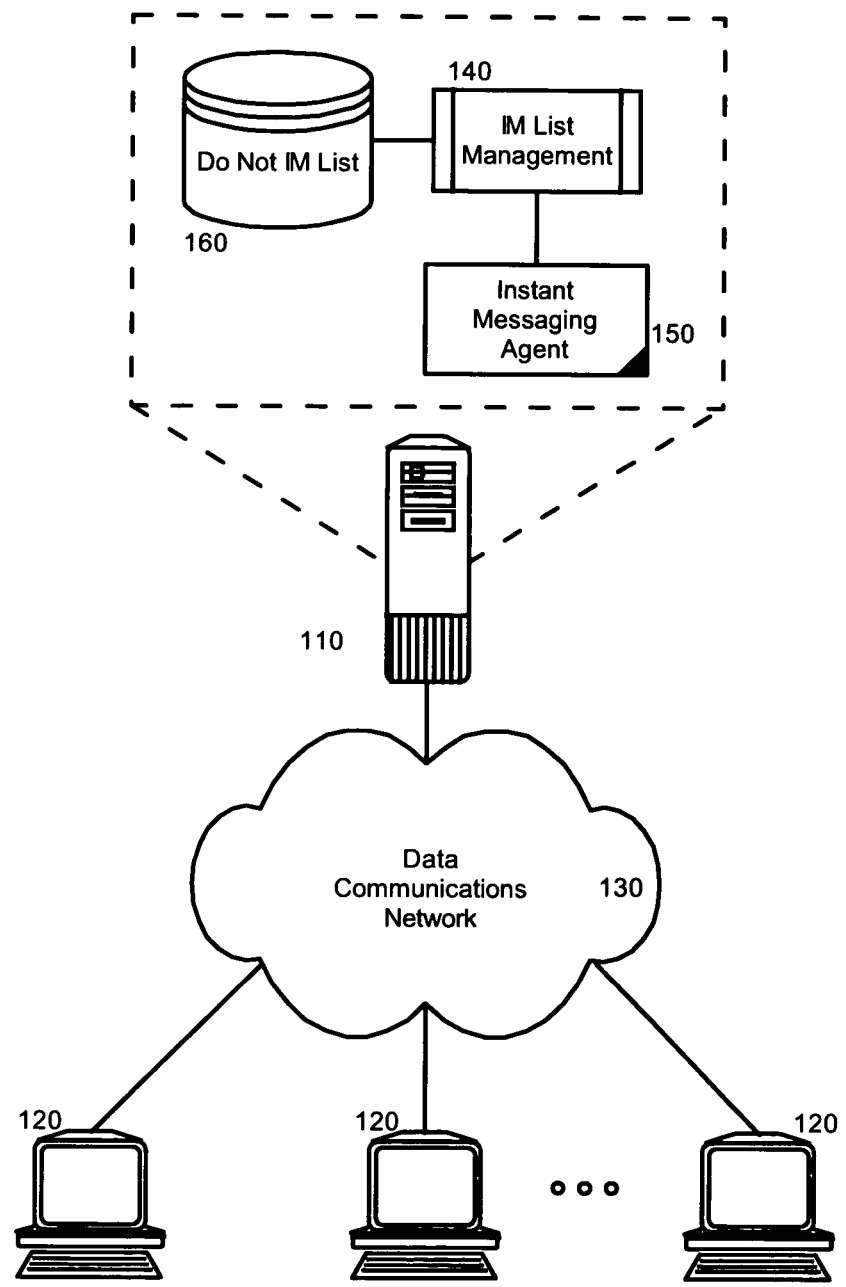
FIG. 1 is a schematic illustration of a system configured to selectively block unsolicited instant messages according to a do not call instant message list; and, FIG. 2 is a flow chart illustrating a process for selectively blocking unsolicited instant messages according to a do not call instant message list.

In further illustration, FIG. 1 is a schematic illustration of a system configured to selectively block unsolicited instant messages according to a do not call instant message list. The system can include at least one instant messaging provider 110 configured to manage instant messaging communications between one or more instant messaging clients 120 over a computer communications network 130. The instant messaging provider 110 can include a do not instant message list 160 storing a listing of recipients who have requested a restriction on the routing of unsolicited instant messages to the recipients. The restriction on routing can range from a complete blockage of all unsolicited instant messages to the selective blocking of unsolicited instant messages based upon the content of the unsolicited instant messages. Examples can include product related instant messages, and service related instant messages.

The instant messaging provider 110 further can include a list management interface 140 through which the instant messaging clients 120 and other external computing processes can add new instant messaging recipients to the do not instant message list 160. The list management interface 140 further can permit the modification of one or more routing policies for one or more of the designated instant recipients in the do not instant message list 160. Specifically, the routing policies can specify the selective blocking of unsolicited messages based upon the content of the unsolicited instant messages. Finally, an instant messaging agent 150 can enforce the do not instant message list 160 when processing unsolicited instant messages directed to the instant messaging clients 120.

Figure 2:
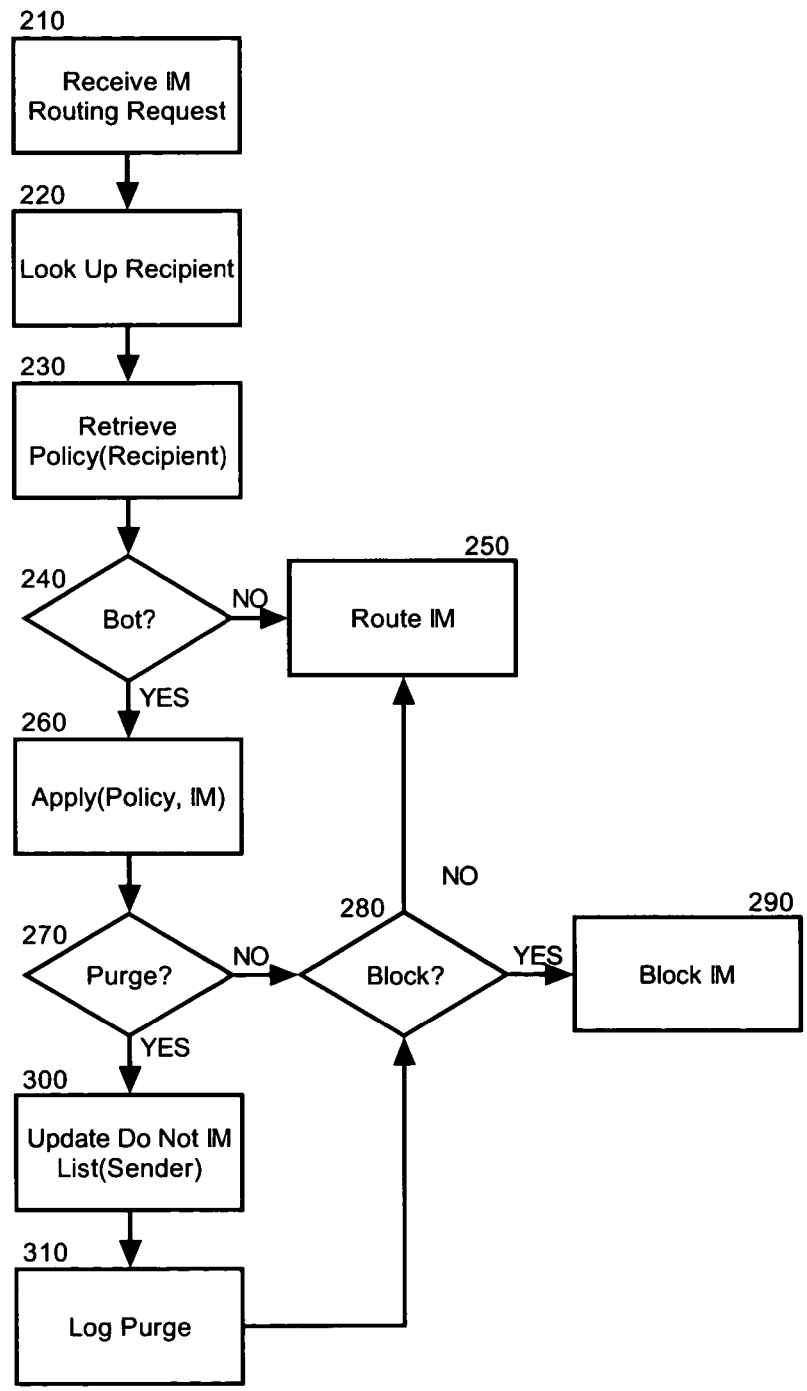

In more particular illustration of the operation of the instant messaging agent 150, FIG. 2 is a flow chart illustrating a process for selectively blocking unsolicited instant messages according to a do not call instant message list. Beginning in block 210 an instant message can be received for routing to an instant messaging client in an instant messaging system. In block 220, the designated recipient can be used to look up an entry in a do not instant message list. As such, a policy can be retrieved for the recipient from the do not instant message list.

In decision block 240, it can be determined whether the received instant message is an unsolicited instant message. For instance it can be determined whether or not the instant message originates from a bot or other automated means. There are several methodologies for detecting the presence of an automated message source, including Turing based methodologies such as question and answer sentries and multi-sensory methodologies such as visual prompts requiring the visual interpretation of an image. In any event, if it is determined that the message is not unsolicited, in block 250 the message can be routed to the designated recipient. Otherwise, the process can continue through block 260.

In block 260, presuming that the received instant message is unsolicited, the retrieved policy can be applied to the received instant message. Exemplary policies can include the absolute blockage of the instant message, the queuing of the instant message for later viewing, the redirection of the instant message to a log file or to an e-mail, to name only a few. Notably, as an additional policy selection, a purge operation can be specified. In this regard, a purge operation can require that the sender of the instant message update a local copy of the do not instant message list so as to incorporate the designated recipient in the local copy.

Specifically, in decision block 270 it can be determined whether a purge operation is warranted. If so, in block 300 the source of the instant message can be passed an updated copy of the do not instant message list. Additionally, in block 310, the purging operation can be logged so as to permit the subsequent detection of a "repeat offender". In any event, in decision block 280, an ultimate decision can be made whether or not to block the instant message. If so, in block 290 the message can be blocked. Otherwise, in block 250 the message can be routed to the designated recipient.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for selectively blocking the transmission of an unsolicited instant message, the method comprising the steps of:

receiving for routing to an instant messaging client, an instant message in an instant messaging server managing instant messaging communications between instant messaging clients over a computer communications network, the instant message designating an intended recipient;

locating said intended recipient in a do not instant message list in the instant messaging server; and, responsive to said location of said intended recipient in said do not instant message list, blocking routing of said instant message for completion of transmission of said instant message to said intended recipient by determining whether said instant message is an unsolicited instant message transmitted from a bot and selectively blocking said instant message if said do not instant message list indicates that unsolicited instant messages are to be blocked, and requiring sender of the instant message update a local copy of the do not instant message list so as to incorporate the designated recipient in the local copy.

2. The method of claim 1, wherein said blocking step comprises the step of selectively blocking said instant message based upon a specified policy defined for said intended recipient.

3. The method of claim 1, wherein said blocking step comprises the step of selectively blocking said instant message based upon a specified policy defined for said intended recipient and for content in said instant message.

4. The method of claim 1, wherein said blocking step comprises the step of performing selective blocking selected from the group consisting of absolutely blocking said instant message, queuing said instant message for later delivery and redirecting said instant message.

5. The method of claim 1, wherein said blocking step further comprises the step of transmitting an updated local copy of said do not instant message list to a source of said instant message.

6. The method of claim 5, further comprising the step of logging said transmission for said source of said instant message.

* * * * *